US012594682B2

(12) United States Patent
Onodera

(10) Patent No.: US 12,594,682 B2
(45) Date of Patent: Apr. 7, 2026

(54) WIRE-BODY FIXING MEMBER, WIRE-BODY-EXTENSION FIXING MEMBER, AND WIRE-BODY FITTING METHOD

(71) Applicant: FANUC CORPORATION, Yamanashi (JP)

(72) Inventor: Yuusei Onodera, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 120 days.

(21) Appl. No.: 18/834,853

(22) PCT Filed: Feb. 22, 2022

(86) PCT No.: PCT/JP2022/007222
§ 371 (c)(1),
(2) Date: Jul. 31, 2024

(87) PCT Pub. No.: WO2023/161989
PCT Pub. Date: Aug. 31, 2023

(65) Prior Publication Data
US 2025/0108523 A1      Apr. 3, 2025

(51) Int. Cl.
*G06F 17/00* (2019.01)
*B25J 19/00* (2006.01)

(52) U.S. Cl.
CPC ................................. *B25J 19/0025* (2013.01)

(58) Field of Classification Search
CPC .................................................... B25J 19/0025
USPC ......................................................... 700/245
See application file for complete search history.

(56) References Cited

U.S. PATENT DOCUMENTS

| | | | | |
|---|---|---|---|---|
| 2014/0083229 A1* | 3/2014 | Kume | ...................... | F16L 3/01 |
| | | | | 901/27 |
| 2015/0068347 A1* | 3/2015 | Kirihara | ............... | B25J 19/0075 |
| | | | | 901/15 |
| 2020/0078097 A1 | 3/2020 | Gregerson et al. | | |

(Continued)

FOREIGN PATENT DOCUMENTS

| | | | | | |
|---|---|---|---|---|---|
| CN | 104339365 A | * | 2/2015 | ......... | B25J 19/0025 |
| DE | 102013015926 A1 | * | 3/2014 | ............... | F16L 3/01 |
| DE | 112022005673 T5 | * | 12/2024 | ......... | B25J 19/0025 |

(Continued)

OTHER PUBLICATIONS

Cables, Wires and Accessories for Robotics (Year: 2025).*

(Continued)

*Primary Examiner* — Ronnie M Mancho
(74) *Attorney, Agent, or Firm* — KARCESKI IP LAW, PLLC

(57)      ABSTRACT

A wire body fixing member includes a first fixing member body that is fixed to an outer surface of a robot and that lashes a first wire body, and first protection members that respectively cover opposite end surfaces of the first fixing member body, the opposite end surfaces of the first fixing member body being disposed to protrude outward relative to an outer diameter of the first wire body in a state where the first wire body is lashed. At least one of the first protection members is fixed in a detachable manner to the first fixing member body by using a bolt fastened to a threaded hole provided in one end surface of the first fixing member body.

3 Claims, 7 Drawing Sheets

(56)                References Cited

U.S. PATENT DOCUMENTS

| | | | |
|---|---|---|---|
| 2020/0238508 A1 * | 7/2020 | Inoue ....................... | B25J 18/00 |
| 2025/0108523 A1 * | 4/2025 | Onodera ............. | B25J 19/0025 |

FOREIGN PATENT DOCUMENTS

| | | | | |
|---|---|---|---|---|
| EP | 2829368 A2 * | 1/2015 | ......... | B25J 19/0025 |
| JP | 2011054816 A | 3/2011 | | |
| JP | 2011234521 A | 11/2011 | | |
| JP | 2014065110 A | 4/2014 | | |
| JP | 5591894 B2 * | 9/2014 | ............... | F16L 3/22 |
| JP | 2014159081 A | 9/2014 | | |
| JP | 2015054388 A | 3/2015 | | |
| JP | 2015123505 A | 7/2015 | | |
| JP | 6184161 B2 * | 8/2017 | ......... | B25J 19/0025 |
| JP | 2020011342 A | 1/2020 | | |
| JP | 2020116686 A | 8/2020 | | |
| WO | WO-2023161989 A1 * | 8/2023 | ......... | B25J 19/0025 |

OTHER PUBLICATIONS

Japanese Office Action dated Oct. 7, 2025, for Japanese Patent Application No. 2024-502600.
International Search Report dated May 10, 2022, for International Patent Application No. PCT/JP2022/007222.

* cited by examiner

WIRE-BODY FIXING MEMBER, WIRE-BODY-EXTENSION FIXING MEMBER, AND WIRE-BODY FITTING METHOD

CROSS-REFERENCE TO RELATED APPLICATION(S)

This is a National Stage Entry into the United States Patent and Trademark Office from International Patent Application No. PCT/JP2022/007222, filed on Feb. 22, 2022, the entire content of which is incorporated herein by reference.

FIELD OF THE INVENTION

The present disclosure relates to wire-body fixing members, wire-body-extension fixing member, and wire-body fitting methods.

BACKGROUND OF THE INVENTION

A known wire-body fixing member in the related art fixes a basic cable to an outer surface of a robot (e.g., see Publication of Japanese Patent No. 6985309). This wire-body fixing member has an end coupled to a wire-body-extension fixing member, so that a retrofit wire body can be routed along the same path as the basic cable.

SUMMARY OF INVENTION

A wire-body fixing member includes: a first fixing member body that is fixed to an outer surface of a robot and that lashes a first wire body; and first protection members that respectively cover opposite end surfaces of the first fixing member body, the opposite end surfaces of the first fixing member body being disposed to protrude outward relative to an outer diameter of the first wire body in a state where the first wire body is lashed. At least one of the first protection members is fixed in a detachable manner to the first fixing member body by using a bolt fastened to a threaded hole provided in one end surface of the first fixing member body.

DESCRIPTION OF EMBODIMENT(S) OF THE INVENTION

A wire-body fixing member 1, a wire-body-extension fixing member 60, and a wire-body fitting method according to an embodiment of the present disclosure will be described below with reference to the drawings.

Figure 1:
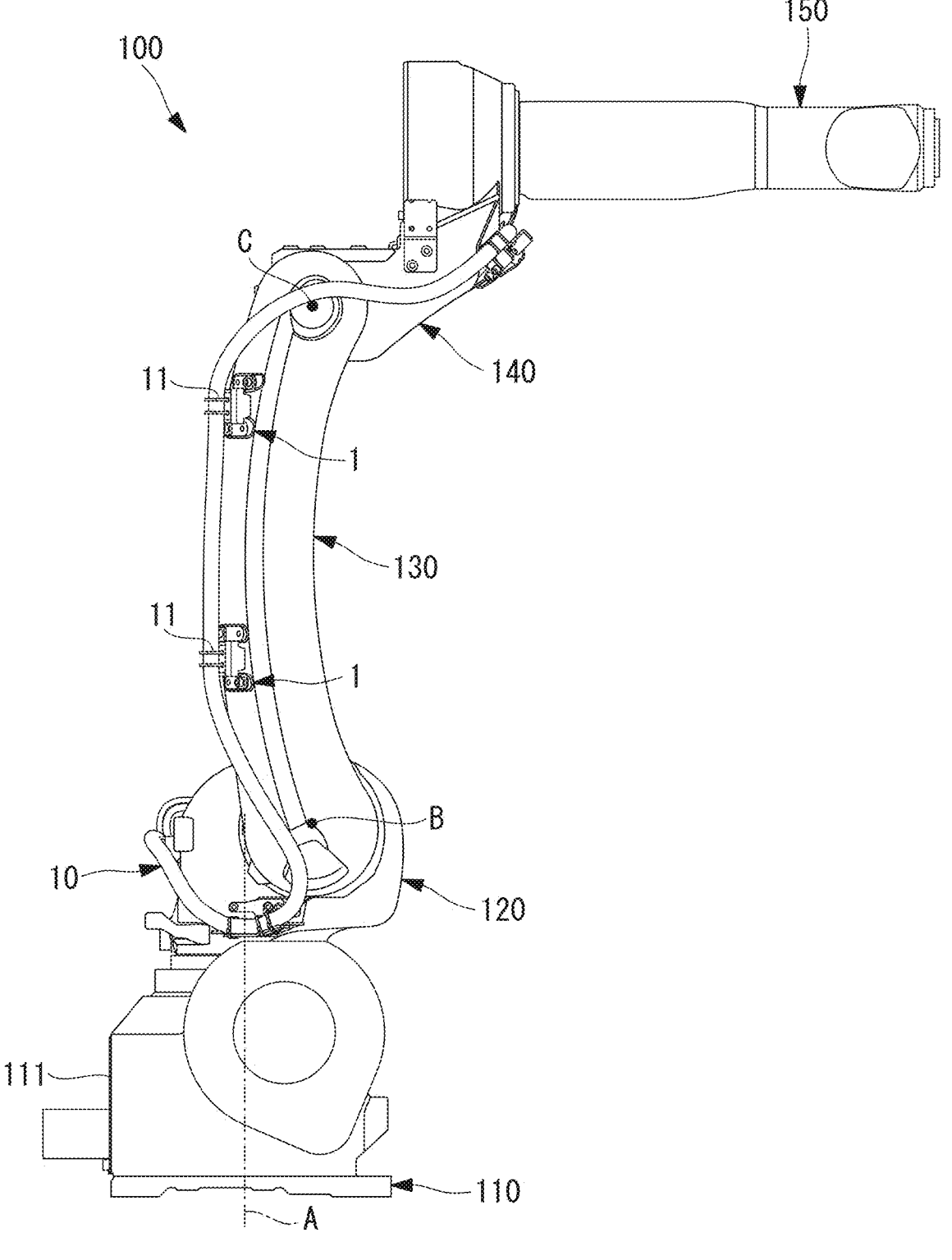
FIG. 1 is a side view illustrating a collaborative robot equipped with a wire-body fixing member according to an embodiment of the present disclosure.

As shown in FIG. 1, the wire-body fixing member 1 according to this embodiment is fixed to the outer surface of a collaborative robot (robot) 100 and is used for fitting a first wire body, such as a cable, along the outer surface of the collaborative robot 100.

The collaborative robot 100 is, for example, a vertical six-axis articulated robot and includes a base 110 installed on an installation surface and a rotating body 120 supported in such a manner as to be rotatable about a vertical first axis A relative to the base 110. Moreover, the collaborative robot 100 includes a first arm 130 supported in such a manner as to be rotatable about a horizontal second axis B relative to the rotating body 120, and also includes a second arm 140 supported by the distal end of the first arm 130 in such a manner as to be rotatable around a third axis C parallel to the second axis B. The collaborative robot 100 further includes a three-axis wrist unit 150 supported by the distal end of the second arm 140.

The collaborative robot 100 includes a first wire body 10 serving as a basic cable for transmitting a driving force and a control signal to a motor that drives each joint. As shown in FIG. 1, the first wire body 10 extends into the base 110 from a connection panel 111 at the rear surface of the base 110, is routed to an upper side of the rotating body 120, is then fixed to the rotating body 120 below the first arm 130, and is subsequently bent upward at a position located toward the front of the first arm 130. The bent first wire body 10 is disposed along a side surface of the first arm 130 and is fixed to the first arm 130 at two intermediate positions in the longitudinal direction of the first arm 130.

Two wire-body fixing members 1 are fixed to the side surface of the first arm 130 with a distance therebetween in the longitudinal direction of the first arm 130. The first wire body 10, such as a basic cable, is lashed to each wire-body fixing member 1 by using a binder 11, such as a nylon band.

Figure 2:
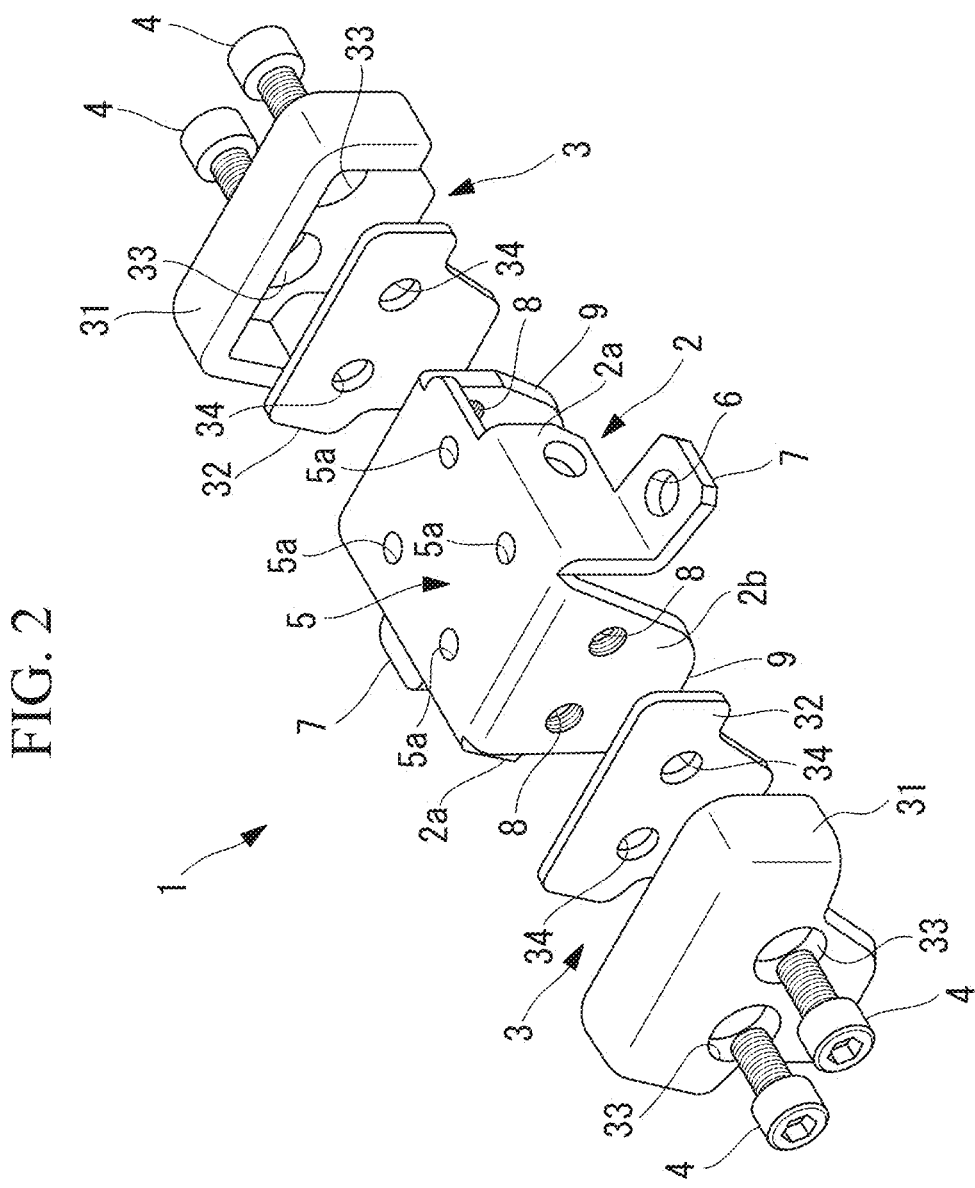
FIG. 2 is an exploded perspective view illustrating the wire-body fixing member in FIG. 1.

As shown in FIG. 2, each wire-body fixing member 1 includes a fixing member body (first fixing member body) 2 that is fixed, by using bolts (not shown), to a bearing surface (not shown) provided at an outer surface of the first arm 130, and also includes protection members (first protection members) 3 detachably fixed to opposite ends of the fixing member body 2 by using bolts 4.

As shown in FIG. 2, the fixing member body 2 is formed by pressing a metallic flat plate into a shape of a box having four sidewalls 2a and 2b that are bent at a substantially right angle toward the rear surface from the four sides of a rectangular lashing surface section 5. The sidewalls 2a extending along the two long sides of the fixing member body 2 have distal ends that are further bent parallel to the lashing surface section 5, and are provided with through-holes 6 extending through the sidewalls 2a in the thickness direction, thereby forming fixing sections 7 for fixing the fixing member body 2 to the bearing surface of the first arm 130 by using two bolts. The sidewalls (one end surfaces) 2b extending along the two short sides of the fixing member body 2 extend parallel to each other and are provided with threaded holes 8 extending through the sidewalls 2b in the thickness direction, thereby forming attachment sections 9 for detachably attaching the protection members 3 by using the bolts 4.

Figure 3:
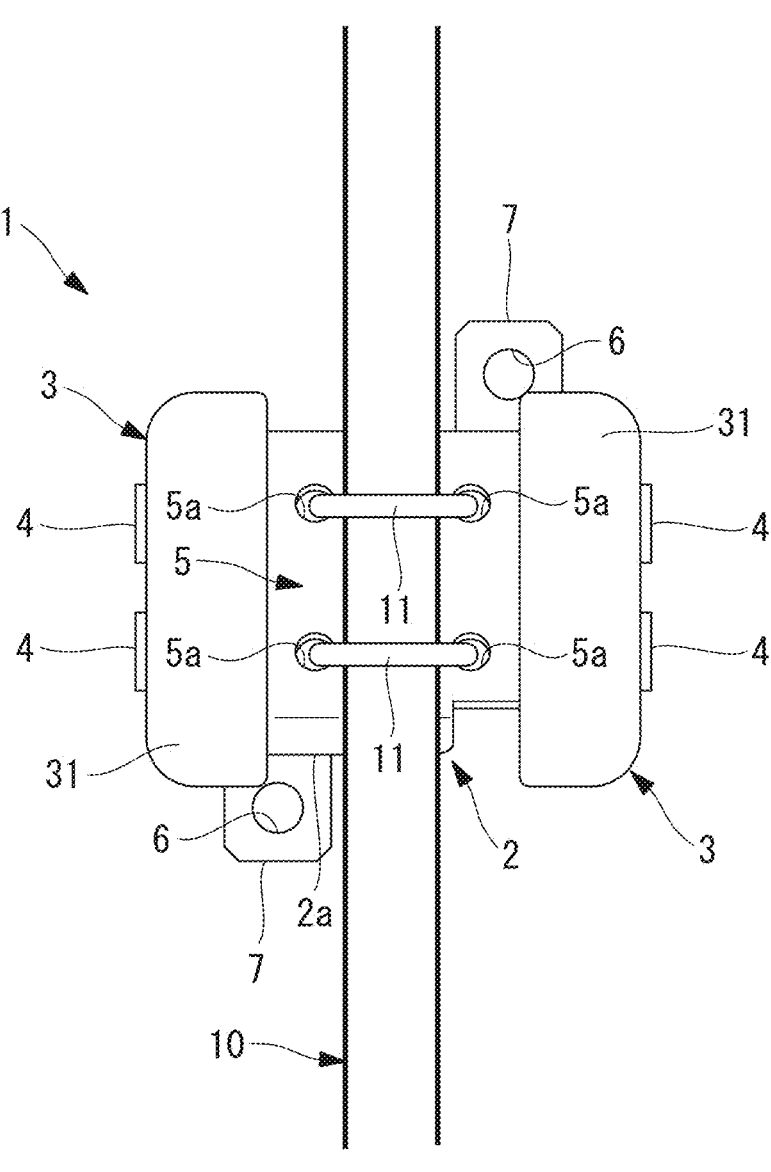
FIG. 3 is a front view illustrating a state where a first wire body is fixed to the wire-body fixing member in FIG. 2.

The lashing surface section 5 is provided with two pairs, that is, four, through-holes 5a extending therethrough in the thickness direction. As shown in FIG. 3, the first wire body 10 is disposed in the short-side direction between the two pairs of through-holes 5a disposed with a distance therebetween in the direction extending along the long sides, and the binders 11 respectively extending through the pairs of through-holes 5a are tightened. Accordingly, the first wire body 10 is fixed while being lashed to the surface of the lashing surface section 5 by the binders 11. Since the outer periphery of the lashing surface section 5 of the fixing member body 2 that is box-shaped by bending the metallic flat plate toward the rear surface does not have an edge along the entire perimeter, the lashed first wire body 10 is not damaged by an edge.

As shown in FIG. 2, each protection member 3 is formed by bonding a metallic flat plate 32 to one surface of a protection member body 31 composed of urethane. The protection member body 31 and the metallic flat plate 32 are respectively provided with through-holes 33 and 34. By fastening the bolts 4 extending through the through-holes 33 and 34 to the threaded holes 8 in the attachment sections 9 of the fixing member body 2, the protection members 3 can be detachably fixed to the opposite ends of the fixing member body 2.

As shown in FIG. 2 and FIG. 3, the protection members 3 are fixed to the attachment sections 9 at the opposite ends of the fixing member body 2 having the first wire body 10 lashed thereto, so that the opposite ends of the fixing member body 2 exposed in the radial direction of the first wire body 10 are covered with the protection members 3 while the first wire body 10 is lashed. Accordingly, with regard to the collaborative robot 100 that operates in a state where a person is approaching, the opposite ends of the fixing member body 2 where the contact pressure increases in response to contact with the person are covered with the protection members 3, which are flexible, thereby preventing the person in contact with the collaborative robot 100 from receiving high contact pressure.

The following description relates to a case where a second wire body 40 to be added is fixed in a retrofitted manner to the collaborative robot 100 having the above-described configuration.

Figure 4:
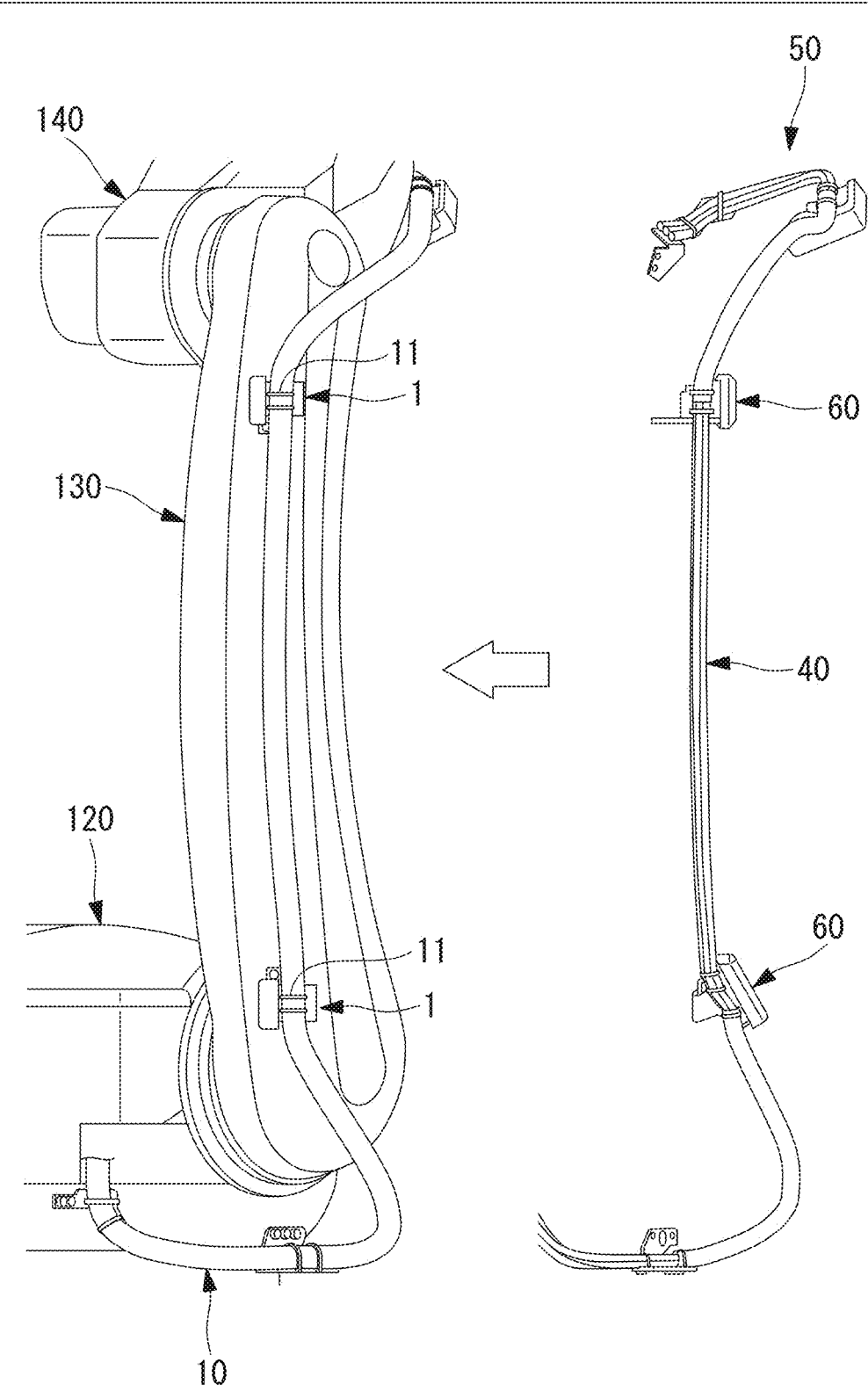
FIG. 4 is a partial side view illustrating a case where a second wire body is added by using a wire-body-extension fixing member according to an embodiment of the present disclosure.

As shown in FIG. 4, in this embodiment, a retrofit wire body unit 50 obtained by preliminarily fixing wire-body-extension fixing members 60 to the second wire body 40 is prepared and added without removing the first wire body 10 fixed to the first arm 130 by the wire-body fixing members 1.

Figure 5:
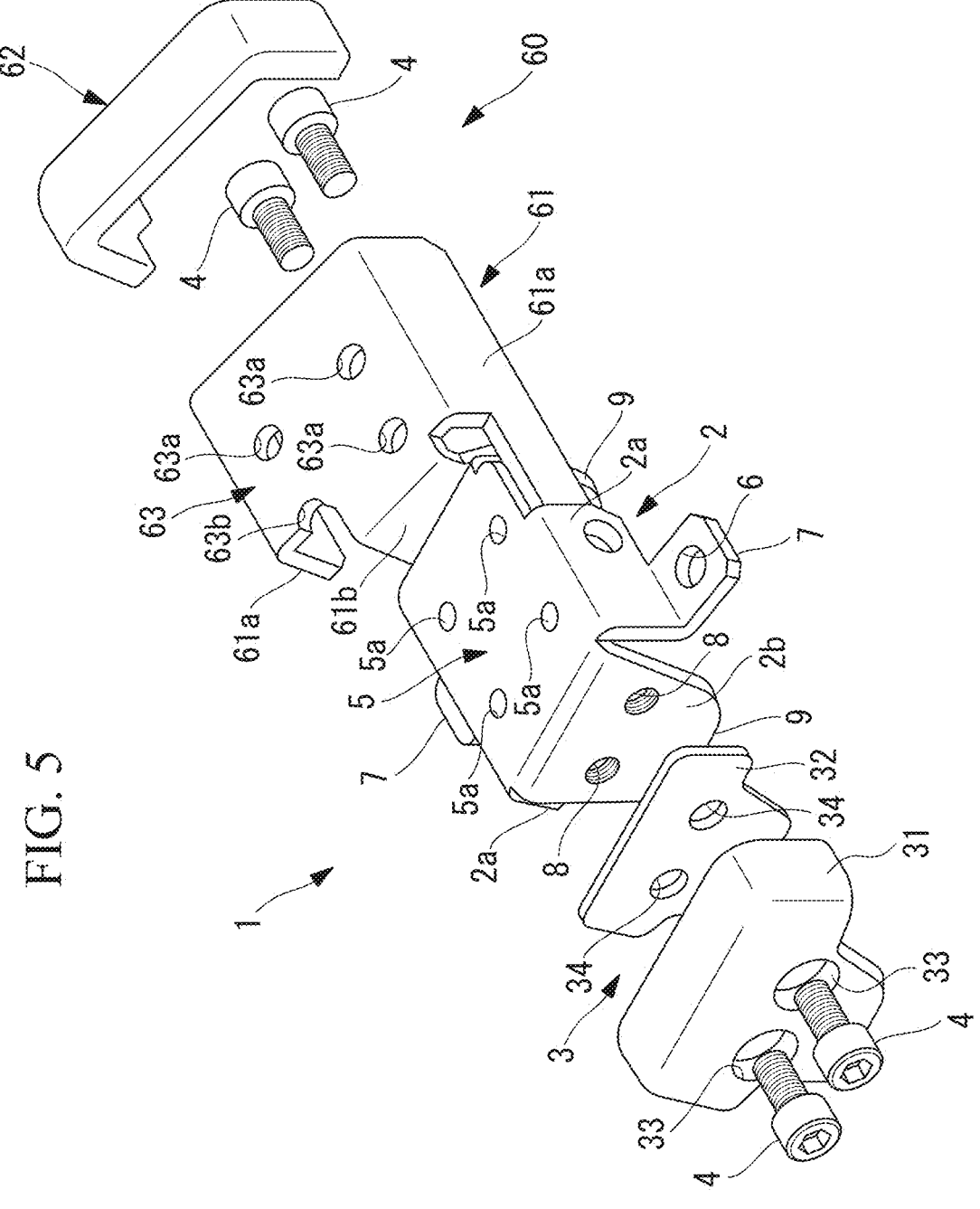
FIG. 5 is an exploded perspective view illustrating the wire-body-extension fixing member in FIG. 4 that is attached to the wire-body fixing member in FIG. 1.

As shown in FIG. 5, each wire-body-extension fixing member 60 includes a fixing member body (second fixing member body) 61 and a protection member (second protection member) 62.

The fixing member body 61 is formed by pressing a metallic flat plate into a shape of a box having three sidewalls 61a and 61b that are bent at a right angle in the same direction from three sides of a rectangular lashing surface section 63.

Figure 6:
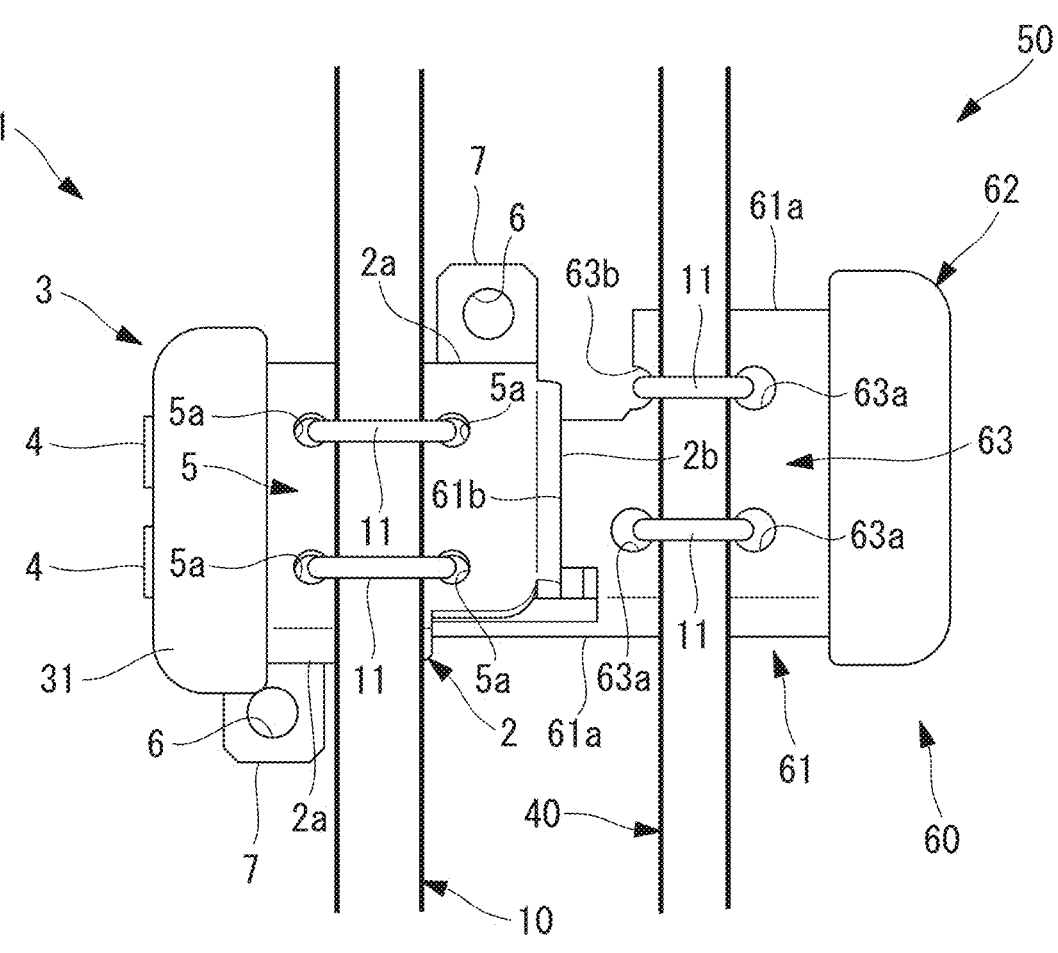
FIG. 6 is a front view illustrating a state where the second wire body is fixed parallel to the first wire body by using the wire-body-extension fixing member in FIG. 5.

Similar to the wire-body fixing member 1, the lashing surface section 63 is provided with two pairs, that is, four, through-holes 63a and 63b extending therethrough in the thickness direction. One through-hole 63b is a cut-out. As shown in FIG. 6, the second wire body 40 extending in the short-side direction is disposed between the two pairs of through-holes 63a and 63b disposed with a distance therebetween in the direction extending along the long sides, and the binders 11 respectively extending through the pairs of through-holes 63a are tightened. Accordingly, the second wire body 40 can be fixed while being lashed to the surface of the lashing surface section 63 by the binders 11.

The sidewalls 61a extending along the two long sides of the fixing member body 61 extend parallel to each other. The sidewall (one end) 61b extending along one of the short sides of the fixing member body 61 is provided with through-holes (not shown) extending therethrough in the thickness direction, and an end surface (other end) extending along the other short side has the protection member 62 bonded thereto.

The through-holes provided in the one sidewall 61b are provided at the same pitch as the threaded holes 8 provided in each attachment section 9 of the wire-body fixing member 1. The one sidewall 61b is brought into close contact with the attachment section 9 of the wire-body fixing member 1 from which the protection member 3 has been removed, and the bolts 4 extending through the through-holes are fastened to the threaded holes 8, whereby the fixing member body 61 of the wire-body-extension fixing member 60 can be fixed to the attachment section 9 of the wire-body fixing member 1.

The lashing surface section 63 of the wire-body-extension fixing member 60 is set at a preset angle relative to the lashing surface section 5 of the wire-body fixing member 1. When the fixing member body 61 of the wire-body-extension fixing member 60 is fixed to the attachment section 9 of the wire-body fixing member 1, the lashing surface section 63 of the wire-body-extension fixing member 60 and the lashing surface section 5 of the wire-body fixing member 1 are fixed at an angle with each other.

With the wire-body-extension fixing member 60 being fixed to the attachment section 9 of the wire-body fixing member 1, the second wire body 40 lashed to the wire-body-extension fixing member 60 is disposed parallel to the first wire body 10 lashed to the wire-body fixing member 1, so as to be fitted through substantially the same path as the first wire body 10.

In this state, the sidewall 61b of the wire-body-extension fixing member 60 is fixed to one of the sidewalls 2b of the fixing member body 2 of the wire-body fixing member 1 and is disposed between the first wire body 10 and the second wire body 40, so as not to be exposed radially outward of the first wire body 10 and the second wire body 40. On the other hand, the other end of the wire-body-extension fixing member 60 is also covered with the protection member 62. Accordingly, with regard to the collaborative robot 100 that operates in a state where a person is approaching, the opposite ends of the fixing member bodies 2 and 61 where the contact pressure increases in response to contact with the person are covered with the protection members 3 and 62, which are flexible, thereby preventing the contact pressure from increasing.

With the wire-body fixing member 1 according to this embodiment, in the state where the first wire body 10 is attached to the outer surface of the collaborative robot 100 by using each wire-body fixing member 1, the contact pressure against the person in contact therewith from the outside can be reduced by the protection members 3. Furthermore, when the second wire body 40 is to be added, the already-fitted first wire body 10 does not have to be removed. This is advantageous in that, by simply removing the protection member 3 at one end of the fixing member body 2, the second wire body 40 can be added readily by using the threaded holes 8 to which the protection member 3 is previously attached.

Furthermore, the wire-body-extension fixing member 60 according to this embodiment can be coupled to the fixing member body 2 by using the threaded holes 8 at one end of the fixing member body 2 from which the protection member 3 has been removed. Accordingly, the second wire body 40 can be fitted through a similar path as the first wire body 10 without having to remove the first wire body 10.

In this case, even in the state where the second wire body 40 is added, the protection members 3 and 62 can reduce the contact pressure against the person coming into contact with the collaborative robot 100 from the outside. Moreover, by performing the fitting process by means of the retrofit wire body unit 50 in which the second wire body 40 is attached to the wire-body-extension fixing members 60, torsion or bending to be applied to the second wire body 40 can be readily reproduced by simply fixing each wire-body-extension fixing member 60 to the corresponding wire-body fixing member 1. By setting an angle between the lashing surface section 63 of the wire-body-extension fixing member 60 and the lashing surface section 5 of the wire-body fixing member 1, the second wire body 40 can be fixed at an appropriate angle in the vicinity of the first wire body 10.

Specifically, the wire-body fitting method according to this embodiment involves adding the second wire body 40 to the collaborative robot 100 to which the first wire body 10 is fitted by using each wire-body fixing member 1. This method first includes preparing the retrofit wire body unit 50 in which the second wire body 40 is lashed to the fixing member body 61 of each wire-body-extension fixing member 60.

Then, the protection member 3 is removed from the sidewall 2b serving as one end surface of the fixing member body 2 of the wire-body fixing member 1. In a state where the sidewall 61b serving as one end of the fixing member body 61 of the wire-body-extension fixing member 60 is brought into close contact with the sidewall 2b of the fixing member body 2, the bolts 4 are extended through the through-holes in the sidewall 61b and are fastened to the threaded holes 8 in the attachment section 9. Accordingly, the wire-body-extension fixing member 60 is coupled to the wire-body fixing member 1, so that the second wire body 40 can be fitted to the outer surface of the collaborative robot 100 through a similar path as the first wire body 10 without having to remove the first wire body 10.

When the retrofit wire body unit 50 is to be manufactured in a factory, for example, the retrofit wire body unit 50 is manufactured by being actually fitted to a model equipped with the same wire-body fixing member 1 at the same position as the collaborative robot 100 to which the retrofit wire body unit 50 is planned to be attached. Specifically, the actual fitting process involves determining the length of a movable part of the second wire body 40 in view of, for example, the operating range of the first arm 130 relative to the rotating body 120 and the operating range of the second arm 140 relative to the first arm 130. Moreover, by applying appropriate bending and torsion to the second wire body 40, the second wire body 40 can move without coming into contact with, for example, the first wire body 10 and the rotating body 120, which is a surrounding structural body, when the movable part of the second wire body 40 bends.

Accordingly, the second wire body 40 receiving bending and torsion similar to those in the actual outfitting is lashed to the wire-body-extension fixing member 60 by using the binders 11, and is subsequently removed from the wire-body fixing member 1 of the model, whereby the retrofit wire body unit 50 is manufactured. Therefore, by simply coupling the wire-body-extension fixing member 60 of the retrofit wire body unit 50 to the wire-body fixing member 1 of the collaborative robot 100, the second wire body 40 can be fitted in a state where the length, bending, and torsion of the movable part applied during the manufacturing process are reproduced.

If the wire-body fixing member 1 for lashing the first wire body 10 is to be provided with a lashable part by preliminarily adding the second wire body 40, it is necessary to perform the fitting process while adjusting the length, bending, and torsion of the movable part on site.

This embodiment does not have such a problem and is advantageous in being able to facilitate the on-site adding process of the second wire body 40 and to reduce the number of processes.

When the second wire body 40 is to be added, it is conceivable to remove the first wire body 10 and replace the entire retrofit wire body unit 50 in which the first wire body 10 and the second wire body 40 are fixed to the wire-body fixing member 1. In this case, it is not necessary to perform the fitting process while adjusting the length, bending, and torsion of the movable part on site. However, this is problematic in terms of high cost since the process also includes replacing the first wire body 10. Since this embodiment facilitates the on-site adding process of the second wire body 40 without having to remove the first wire body 10, the embodiment is advantageous in that the cost can be significantly reduced.

In the wire-body fixing member 1 according to this embodiment, the protection members 3 covering the sidewalls 2b serving as opposite end surfaces of the fixing member body 2 are provided in a detachable manner by using the bolts 4. As an alternative to the above-described case where the wire-body-extension fixing member 60 is attached by removing the protection member 3 for the sidewall (one end surface) 2b of the fixing member body 2, the protection members 3 for the opposite sidewalls (opposite end surfaces) 2b of the fixing member body 2 may be removed, and two second wire bodies 40 may be added to opposite sides of the fixing member body 2 by using two wire-body-extension fixing members 60.

As an alternative to the above-described case where the protection members 3 covering the opposite sidewalls (opposite end surfaces) 2b of the fixing member body 2 are provided in a detachable manner by using the bolts 4, if the wire-body-extension fixing member 60 is to be coupled to only one sidewall (one end surface) 2b, the protection member 3 for the other sidewall (other end surface) 2b may be bonded to the fixing member body 2 in a non-detachable manner.

As an alternative to the above-described case where the protection member 62 is bonded to the sidewall (one end) 61b of the fixing member body 61 of the wire-body-extension fixing member 60, the protection member 62 may be fixed in a detachable manner to the threaded holes 8 provided in the sidewall (end surface) 2b of the fixing member body 2 by using the bolts 4. Accordingly, the protection member 62 for the wire-body-extension fixing member 60 coupled to the wire-body fixing member 1 may be removed, and another wire-body-extension fixing member 60 may be further coupled thereto.

Figure 7:
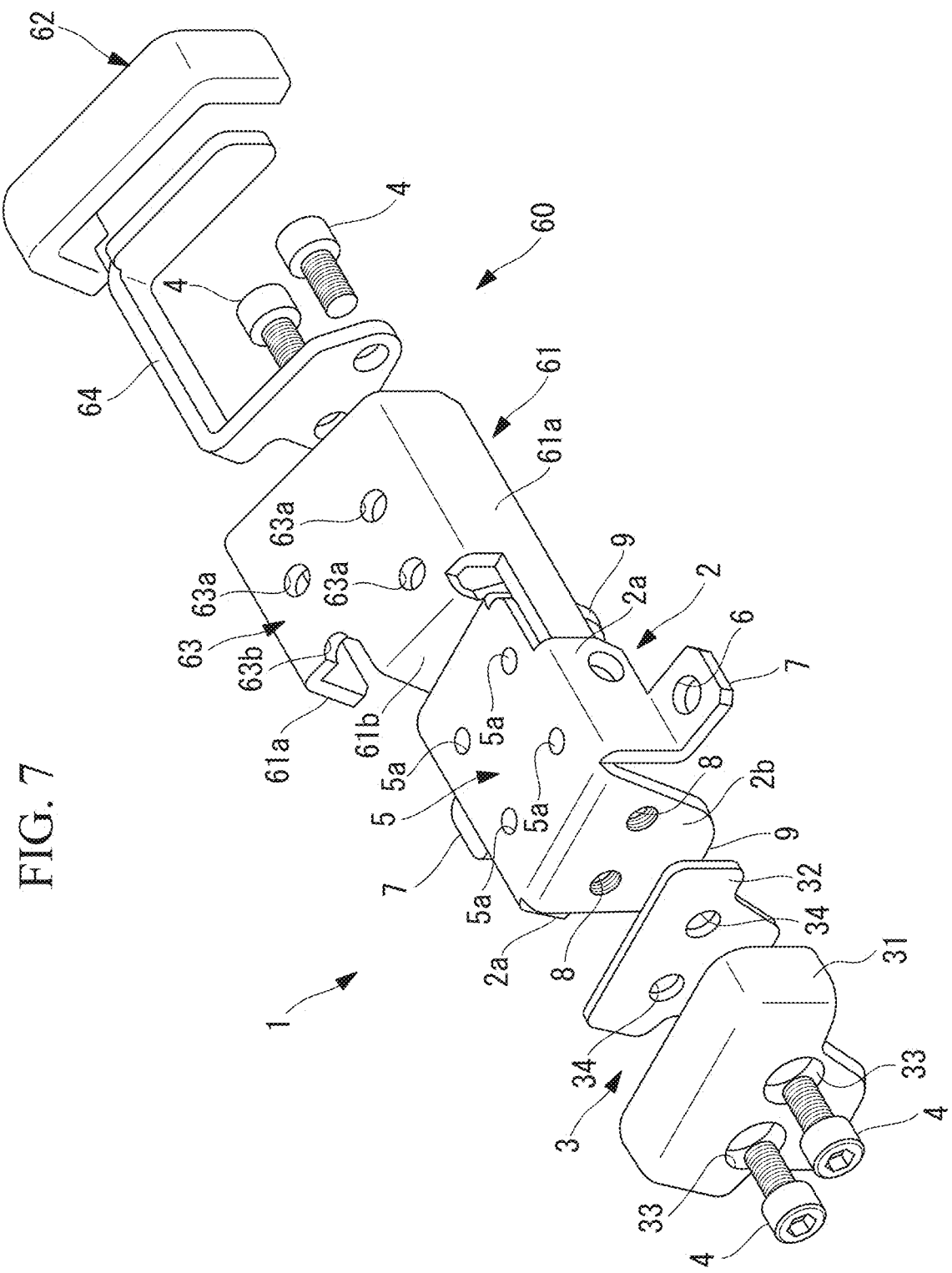
FIG. 7 is an exploded perspective view illustrating a modification of the wire-body-extension fixing member in FIG. 4 that is attached to the wire-body fixing member in FIG. 1.

Furthermore, as shown in FIG. 7, by using the bolts 4 for fixing the fixing member body 61 of the wire-body-extension fixing member 60 to the wire-body fixing member 1, the protection member 62 may be disposed at a position where it covers the other end of the wire-body-extension fixing member 60 by using an additional member 64.

In the wire-body fixing member 1 according to this embodiment, the basic cable is described as being the first wire body 10. Alternatively, the basic cable may be contained within, for example, the first arm 130, and a retrofit wire body may be externally attached as the first wire body 10.

The invention claimed is:

1. A wire-body fixing member comprising:

a first fixing member body that is fixed to an outer surface of a robot and that lashes a first wire body; and first protection members that respectively cover opposite end surfaces of the first fixing member body, the opposite end surfaces of the first fixing member body being disposed to protrude outward relative to an outer diameter of the first wire body in a state where the first wire body is lashed, wherein at least one of the first protection members is fixed in a detachable manner to the first fixing member body by using a bolt fastened to a threaded hole provided in one end surface of the first fixing member body.

2. A wire-body-extension fixing member that is used in combination with the wire-body fixing member according to claim 1 and that is for fixing a second wire body to be added, the wire-body-extension fixing member comprising:

a second fixing member body to which the second wire body to be retrofitted is lashed and that is provided with a through-hole through which the bolt extends, the through-hole being provided at one end disposed in close contact with the one end surface of the first fixing member body from which a first protection member has been removed; and a second protection member that covers the other end of the second fixing member body.

3. A method for adding the second wire body to the robot fitted with the first wire body by using the wire-body fixing member according to claim 2, comprising:

preparing a retrofit wire body unit in which the second wire body is lashed to the second fixing member body of the wire-body-extension fixing member according to claim 2;

removing the first protection member from the one end surface of the first fixing member body of the wire-body fixing member; and coupling the wire-body-extension fixing member to the wire-body fixing member by fastening the bolt to the threaded hole in a state where the one end of the second fixing member body of the retrofit wire body unit is in close contact with the one end surface of the first fixing member body.

* * * * *